(12) United States Patent
Rogers

(10) Patent No.: US 9,002,149 B2
(45) Date of Patent: Apr. 7, 2015

(54) DISTRIBUTED FIBRE OPTIC SENSING FOR EVENT DETECTION

(75) Inventor: Alan John Rogers, Surrey (GB)

(73) Assignee: Fotech Solutions Limited, London (GB)

(*) Notice: Subject to any disclaimer, the term of this patent is extended or adjusted under 35 U.S.C. 154(b) by 407 days.

(21) Appl. No.: 13/128,658

(22) PCT Filed: Nov. 12, 2009

(86) PCT No.: PCT/GB2009/002650
§ 371 (c)(1),
(2), (4) Date: May 11, 2011

(87) PCT Pub. No.: WO2010/055293
PCT Pub. Date: May 20, 2010

(65) Prior Publication Data
US 2011/0216996 A1    Sep. 8, 2011

(30) Foreign Application Priority Data
Nov. 12, 2008 (GB) .................................. 0820658.3

(51) Int. Cl.
G02B 6/00 (2006.01)
G01M 11/00 (2006.01)
G01D 5/353 (2006.01)

(52) U.S. Cl.
CPC ........... *G01M 11/3181* (2013.01); *G01D 5/353* (2013.01); *G01M 11/3109* (2013.01)

(58) Field of Classification Search
USPC ..................................................... 385/12, 11
See application file for complete search history.

(56) References Cited

U.S. PATENT DOCUMENTS

| 5,026,141 A | 6/1991 | Griffiths |
| 5,064,270 A | 11/1991 | Turpin et al. |
| 5,194,847 A * | 3/1993 | Taylor et al. ................... 340/557 |
| 5,381,257 A | 1/1995 | Ferrar |

(Continued)

FOREIGN PATENT DOCUMENTS

| EP | 0332473 A1 | 9/1989 |
| GB | 2443661 A | 5/2008 |

(Continued)

OTHER PUBLICATIONS

Galtarossa et al., "Spatially Resolved PMD Measurements," J. of Lightwave Technology, 22:(4):1103-1115, Apr. 2004.

(Continued)

*Primary Examiner* — Kaveh Kianni
(74) *Attorney, Agent, or Firm* — K&L Gates LLP

(57) ABSTRACT

A fiber optic sensing method and apparatus for determining location and direction information of disturbances occurring in the environment of a sensor optical fiber are provided. The method comprises launching optical pulses into at least one polarisation eigenmode of a polarisation maintaining fiber as the sensor optical fiber, detecting temporal speckle patterns of light backscattered from the at least one polarisation eigenmode of the fiber, comparing the temporal speckle patterns to determine the location and direction information of a disturbance in the environment of the sensor optical fiber. The location information may be a distance along the fiber, and the direction information may be a direction radially from the axis of the fiber. The apparatus or instrument may be used to detect disturbance over long distances such as pipes, pipelines, or wells. Other applications include detecting intruders entering a controlled area.

29 Claims, 6 Drawing Sheets

(56) References Cited

U.S. PATENT DOCUMENTS

| | | | |
|---|---|---|---|
| 5,835,199 A * | 11/1998 | Phillips et al. | 356/5.03 |
| 6,057,911 A | 5/2000 | Reich | |
| 6,144,790 A | 11/2000 | Bledin | |
| 6,211,962 B1 | 4/2001 | Nolan | |
| 6,400,450 B1 | 6/2002 | Golowich et al. | |
| 6,876,786 B2 * | 4/2005 | Chliaguine et al. | 385/13 |
| 7,741,618 B2 * | 6/2010 | Lee et al. | 250/458.1 |
| 7,947,945 B2 * | 5/2011 | Bookbinder et al. | 250/227.14 |
| 8,050,747 B2 * | 11/2011 | Tearney et al. | 600/476 |
| 8,150,496 B2 * | 4/2012 | Tearney et al. | 600/425 |
| 2004/0067003 A1 * | 4/2004 | Chliaguine et al. | 385/13 |
| 2005/0018174 A1 | 1/2005 | Yano et al. | |
| 2006/0231771 A1 * | 10/2006 | Lee et al. | 250/458.1 |
| 2006/0285105 A1 | 12/2006 | Fayolle et al. | |
| 2008/0100828 A1 | 5/2008 | Cyr et al. | |
| 2009/0219516 A1 * | 9/2009 | Bookbinder et al. | 356/73.1 |

FOREIGN PATENT DOCUMENTS

| | | |
|---|---|---|
| JP | 62058106 A | 3/1987 |
| JP | 63300932 A | 12/1988 |
| JP | 02181708 | 7/1990 |
| WO | 2006/048647 A2 | 5/2006 |
| WO | WO 2006048647 A2 * | 5/2006 |
| WO | 2006/099056 A2 | 9/2006 |
| WO | 2008/056143 A1 | 5/2008 |

OTHER PUBLICATIONS

Juarez et al., "Polarization discrimination in a phase-sensitive optical time-domain reflectometer intrusion-sensor system," Optics Letters, 30(24):3284-3286, Dec. 15, 2005.

Nakazawa, Theory of Backward Rayleigh Scattering in Polarization-Maintaining Single-Mode Fibers and Its Application to Polarization Optical Time Domain Reflectometry, IEEE J. of Quantum Electronics, QE-19(5):854-861, May 1983.

Tiziani, "Progress in temporal speckle modulation," Optik, 112(9):370-380, 2001.

PCT Written Opinion of the International Searching Authority for International Application No. PCT/GB2009/002650, mailed Mar. 11, 2010, 7 pgs.

* cited by examiner

DISTRIBUTED FIBRE OPTIC SENSING FOR EVENT DETECTION

CROSS REFERENCE TO RELATED APPLICATIONS

This application is a national phase application under 35 U.S.C. §371 of International Application No. PCT/GB2009/002650, filed on Nov. 12, 2009, which claims priority to and the benefit of U.K. Patent Application No. 0820658.3, filed on Nov. 12, 2008, the entire disclosures of each of which are incorporated by reference herein.

TECHNICAL FIELD

The present invention relates to methods and apparatus for detecting the location of disturbances in the environment of an optical fibre. In particular, the present invention relates to a method and apparatus for detecting the direction of the disturbance relative to the optical fibre.

BACKGROUND ART

Optical Time-Domain Reflectometry (OTDR) is a technique for analysing optical fibres as well as other optical components, and is commonly used in the telecommunications industry for analysing breaks in fibre. The technique consists of sending a series of optical pulses along the fibre under test. Light that is backscattered or reflected within the fibre returns back up the fibre and is detected by a photodetector at the point of injection of the optical pulses. The time elapsed from injecting an optical pulse to the time at which a return signal is received provides an indication of the distance to the backscatter or reflection location, because the speed of light in the fibre is known. The technique allows points of high attenuation in the fibre, such as breakages and splice loss, to be detected.

For commonly used OTDR the optical pulse has no coherence requirement. The duration of the optical pulse determines the spatial resolution at which reflection events are measured, that is the spatial resolution is generally limited to the order of the width of the pulse in the fibre. The intensity of the optical pulse determines the dynamic range of the measurement, that is, the ability to determine the location of ever smaller reflection sites.

A related technique uses coherent light pulses in single mode optical fibre. The coherence allows components of the backscattered light to interfere and contribute an intensity variation at the photodetector. The magnitude of this intensity variation depends on the strength with which the light is backscattered and the phase of the light at the point of backscatter. Within the fibre the magnitude and phase of the backscatter vary depending on the position along the length of the fibre. The variation arises from minute variations inherent in the glass of the fibre. External influences or disturbances such as temperature and pressure or the presence of acoustic waves can cause changes in the refractive index of the optical fibre. These changes in refractive index result in a change to the speed of the light pulse and backscattered light along the fibre. The phase of the backscattered light received at the photodetector therefore change as a result of these external influences. Hence, the intensity of the backscattered light also changes under these external influences.

Prior art techniques which use coherent light have found it difficult to determine the location of disturbances or external influences along the length of the fibre. As a result resolution has been limited to the pulse length. To increase resolution the pulse length can be reduced but this often has a consequential effect of reducing the optical power in the pulse. Reduced pulse power reduces the optical power incident on the photodetector, decreasing signal to noise ratio, making it more difficult to perform a useful analysis of disturbances along the fibre.

U.S. Pat. No. 5,194,847 describes an intrusion detection system using coherent light to detect changes in the environment around the fibre that cause perturbations in the optical fibre. The system requires the use of a very coherent light source, for example, having a spectral width of the order of 1-10 kHz. The system is not able to provide information regarding the magnitude of the disturbance acting on the fibre because the change in intensity of light detected by the photodetector does not vary linearly with the magnitude of the disturbance.

WO 2006/048647 describes a technique which uses two partially coherent pulses which interfere following reflection from spaced locations in the fibre. The two pulses allow the detection of localised changes in the refractive index of the fibre. This localisation occurs because the phase change over a localised length of fibre can be measured. Changing the separation between the two pulses allows the length of fibre over which the localisation occurs to be changed. Because the disturbances in the localised length of fibre are generally much less than $\pi$, the magnitude of the phase change is now proportional to the magnitude of the disturbance. Therefore, the magnitude of the disturbance along the fibre can be determined.

WO 2008/056143 mentions that the above described methods are limited by the amount of light that can be launched into the fibre by non-linear effects, such as Brillouin scattering. This type of scattering causes the light to be inelastically backscattered converting it to a different wavelength. Brillouin scattering will attenuate a pulse as it travels down the fibre. Although this type of scattering occurs at all optical powers it increases significantly above a threshold. As a result, the narrow spectral width pulse used in U.S. Pat. No. 5,194,847 severely limits the amount of optical power that can be used in a single pulse, and therefore the technique is unable to provide measurements of changes in refractive index to a high sensitivity.

For a light pulse having a spectral width of less than 17 MHz (the Brilluoin Gain Bandwidth) and a wavelength around 1550 nm travelling in single mode fibre made of silica glass, the power threshold is as low as 5 mW. A paper "Polarisation Discrimination in a Phase-Sensitive Optical Time-Domain Reflectometer Intrusion-Sensor System", Juarez et al, Optics Letters, Vol. 30, No. 24, 15 Dec. 2005, describes an improved method based on U.S. Pat. No. 5,194,847 which uses longer duration, lower power pulses to avoid the problems of Brillouin scattering. However, the proposed pulse length is around 2 µs which limits spatial resolution to around 200 m.

In considering the spectral width of the light pulse WO 2008/056143 proposes light pulses of duration of around 10 ns which have a theoretical spectral width (1/T) of around 0.1 GHz. Pulse widths up to 100 GHz are also considered. By increasing the spectral width the power at any particular wavelength is decreased avoiding Brillouin scattering.

The above described examples can be used in many different environments for detecting very different kinds of disturbances. For example, the system may be used as an intruder detection system where a fibre is laid in the ground around the perimeter of a restricted area. Footsteps in the vicinity of the fibre produce acoustic vibrations which can be detected by temporal changes in the refractive index of the fibre, indicating the presence of an intruder. In another example the fibre can be inserted in a pipeline carrying fluid, such as water, oil, or gas. Cracks in the pipeline or objects hitting the pipe can be detected by the acoustic waves generated by the cracking or hitting event. These two examples both have the problem that although the location of the disturbance along the length of the fibre can be determined, there is no information about from which direction the disturbance occurs. In the first example, the intruder detection system, the direction of the footsteps can be particularly important because instead of indicating an intruder about to cross the perimeter and enter the restricted area, it might indicate a security guard walking around the inside of the perimeter. Thus, it would be advantageous to be able to determine if the footsteps or other disturbance is outside the perimeter or inside the perimeter. Similarly for a detection system in a pipeline, it would be advantageous to determine the direction of origin of the acoustic disturbance to be able to locate the crack easily, or obtain direction information on the hit event.

SUMMARY OF THE INVENTION

The invention provides a fibre optic sensing method for determining location and direction information of disturbances occurring in the environment of a sensor optical fibre, the method comprising: launching optical pulses into at least one polarisation eigenmode of a polarisation maintaining fibre as the sensor optical fibre; detecting temporal speckle patterns of light backscattered from the at least one polarisation eigenmode of the fibre; comparing the temporal speckle patterns to determine the location and direction information of a disturbance in the environment of the sensor optical fibre. The location information may be a distance along the fibre, and the direction information may be a direction radially from the axis of the fibre. Disturbances are determined from changes in the temporal speckle pattern. The temporal speckle patterns are self-interference backscatter patterns which result in variations in intensity of the detected signal over time. A measure of the time variation gives a location along the fibre of a disturbance causing refractive index changes in the fibre at that point, and a variation in a particular localised time frame gives a measure of the size and radial direction of the disturbance relative to the fibre. By the environment of the optical fibre we mean the region surrounding the fibre such that pressure waves or temperatures variations affect the refractive index of the fibre.

The optical pulses are partially coherent pulses such that self-interference occurs, but are not fully coherent such that the power in the optical pulse is not heavily constrained by Brillouin scattering.

The location information of the disturbance may be determined from a range dependent timing of changes in the temporal speckle patterns. The changes in the temporal speckle patterns arise from changes in the refractive index of the fibre along its length caused by the disturbance. The disturbance may be, or may produce, a pressure wave such as an acoustic wave, or a temperature variation.

The direction information may be determined by comparing between one or more temporal speckle patterns detected from each polarisation eigenmode.

The direction information may be determined from a comparison of the temporal speckle patterns at a range specific timing for two polarisation eigenmodes. The range specific timing corresponds to a specific location along the fibre.

The step of launching may comprise launching optical pulses into one or two polarisation eigenmodes of a length of polarisation maintaining fibre; and the step of detecting may comprise detecting temporal speckle patterns of backscattered light from the one or two eigenmodes. To obtain maximum location and direction information pulses may be launched into the two eigenmodes, and backscatter may be detected from the two eigenmodes. However, a simpler implementation may either launch or detect on only one eigenmode.

The step of detecting may comprise splitting the backscattered light into constituent polarisation eigenmodes and detecting the intensity of backscattered light in each eigenmode. Although photodetectors generally detect intensity, amplitudes are preferably used in calculating location and direction information.

The optical pulse may be linearly polarised. The optical pulse may be launched at substantially 45° to the polarisation eigenmodes of the polarisation maintaining fibre such that the amplitudes launched into the two eigenmodes are substantially equal. Alternatively different powers may be launched into the two eigenmodes, or pulses may be launched into one eigenmode only, and after the returning pulse is detected, a pulse may be launched into the other eigenmode.

The step of comparing may comprise: comparing the temporal speckle pattern of backscattered light from a first eigenmode component of a first pulse with the temporal speckle pattern of backscattered light from a first eigenmode component of a second pulse to determine a first change in refractive index of the fibre at a location along the length of the fibre. The step of comparing may also comprise comparing the temporal speckle pattern of backscattered light from a second eigenmode component of the first pulse with the temporal speckle pattern of backscattered light from a second eigenmode component of a second pulse to determine a second change in refractive index at a location along the fibre. The radial direction of the disturbance may be determined from the comparison for each eigenmode.

The method may further comprise calibrating the relationship between changes in the speckle pattern for the polarisation eigenmodes and location and direction information. The method may further comprise calculating the location and direction of the disturbance about the fibre using the relationship determined in the step of calibrating.

The step of calibrating may comprise initiating a disturbance event at a known position in the environment of the sensor optical fibre, the step of detecting may comprise detecting temporal speckle patterns of light backscattered from the polarisation eigenmodes, and may further comprise determining a relationship between the known position and changes in the detected temporal speckle patterns.

The present invention provides a method of determining location and direction information of disturbances occurring in the environment of a boundary or perimeter, such as footsteps approaching a boundary, or an intruder entering a controlled area, the method comprising providing a polarisation maintaining fibre along the boundary and performing the method described above.

The present invention also provides a method of determining location and direction information of disturbances occurring in the environment of a pipeline, pipe, well, or hole, the method comprising providing a polarisation maintaining fibre in or adjacent to the pipeline, pipe, well, or hole and performing the method described above.

The present invention provides a distributed fibre optic sensor instrument or apparatus. The instrument is arranged to determine location and direction information on disturbances occurring in the environment of a sensor optical fibre, the instrument may comprise: a sensor optical fibre comprising a length of polarisation maintaining optical fibre having two polarization eigenmodes; a light source arranged to launch optical pulses into at least one polarisation eigenmode of the sensor fibre; a photodetector for detecting temporal speckle patterns of the optical pulses backscattered from at least one polarisation eigenmode of the length of fibre; an analyser arranged to compare said temporal speckle patterns to determine information of the location and direction of a disturbance in the environment of the sensor fibre. The instrument or apparatus performs a type of phase dependent OTDR. The technique may use partially coherent optical pulses.

The analyser may be configured to determine location information of the disturbance from a range dependent timing of changes in the temporal speckle patterns. The analyser may be configured to determine location information by comparing between one or more temporal speckle patterns detected from each polarisation eigenmode. The direction information may be a radial direction from the axis of the fibre.

The analyser may be arranged to determine said direction information from a comparison of the temporal speckle patterns at a range specific timing for two polarisation eigenmodes.

The light source may be arranged to launch an optical pulse into two polarisation eigenmodes of the length of polarisation maintaining fibre; and the photodetector may be arranged to detect temporal speckle patterns of backscattered light from the two eigenmodes.

The apparatus or instrument may further comprise: a polarisation splitter to split the backscattered light into constituent polarisation eigenmodes; and the photodetector may comprise two photosensitive elements, each arranged to detect the amplitude of backscattered light in each eigenmode.

The optical source may be configured to provide polarised optical pulses.

The analyser may be arranged to perform the steps of: comparing the temporal speckle pattern of backscattered light from a first eigenmode component of a first pulse with the temporal speckle pattern of backscattered light from a first eigenmode component of a second pulse to determine a first change in refractive index of the fibre at a location along the length of the fibre; comparing the temporal speckle pattern of backscattered light from a second eigenmode component of the first pulse with the temporal speckle pattern of backscattered light from a second eigenmode component of a second pulse to determine a second change in refractive index at a location along the fibre; and determining the angular direction of the disturbance from the comparison for each eigenmode.

The analyser may comprise a memory for storing calibration information relating changes in the speckle pattern for the polarisation eigenmodes to location and direction information.

The analyser may be arranged to calculate location and direction information of the disturbance using the calibration information.

The present invention provides an apparatus for determining location and direction information of disturbances occurring in the environment of a boundary, the apparatus comprising the apparatus described above, wherein the polarisation maintaining fibre is provided along the boundary.

The present invention provides an apparatus for determining location and direction information of disturbances occurring in the environment of a pipeline, pipe, well, or hole, the apparatus comprising the apparatus described above, wherein the polarisation maintaining fibre is provided in or adjacent to the pipeline, pipe, well, or hole.

In technique known as the distributed event location (DEL) technique (GB 622207.9; WO 2006/048647) a partially-coherent optical pulse is launched into a single-mode optical fibre. The Rayleigh-backscattered signal from this pulse is photodetected. Each portion of the pulse superimposes, in backscatter at the detector, on every other portion, the various portions having been back-reflected from different points on the fibre. Because the pulse is partially coherent, this leads to an optical interference (at the detector), the amplitude of which will be a function of fibre position, and mapped into the time domain by the backscattered signal.

If the refractive index of the fibre changes at any given point on the fibre, as the result of the impact of an external disturbance (e.g. a pressure or a temperature change), the detected interference pattern corresponding to that point in the fibre also will change, owing to a disturbance in the phase relationships amongst the interfering portions of the pulse. This change can be quantified and located by subtraction of the backscatter traces from successive launched pulses. In this way any disturbance can be detected and located (to within the order of 1 meter) along the fibre for purposes of perimeter security or pipeline monitoring, for example.

The principle described above cannot provide any information on the direction from which the disturbance originates. The invention for which protection is sought rectifies this deficiency.

The idea is to use polarization-maintaining fibre (PMF), instead of standard single-mode fibre, in the DEL arrangement. Such a fibre possesses two linearly-polarized optical birefringence eigenmodes which propagate independently, with very little mutual coupling between them. (Such fibre can be fabricated using an elliptical core, or an asymmetrically-stressed core.) Hence, with the simultaneous launch (although simultaneous launch is not strictly necessary) of an identical partially-coherent optical pulse into each of the two eigenmode axes of the fibre (achieved via the launch of a linearly-polarized pulse at 45° to the eigenmode axes) we have, essentially, two independent interferometers, because the backscattered signals may be detected separately for the two eigenmodes, using a polarization analyzer. The fibre installation also needs care, in particular a minimization of twist, if the coupling between modes is to be kept to a minimum.

Clearly, the direction from which the disturbance originates will be given, within an ambiguity of 180°, by the angle whose tangent is the ratio of the amplitudes of the signals from the two interferometers. The angle will be referred to the direction of the eigenmode axis whose signal is taken as the denominator of the ratio. In order to establish this as a direction in space, it is clear that the directions of the birefringence axes, in space, must be known. This information can be made available by the use of, for example, D-fibre, where the flat of the D corresponds to the direction of the slow axis of the PMF, and which also can be represented on the outside of the cable structure in which the fibre resides, by a groove or stripe. Other means for identifying the orientation of the birefringence axes also exist. For example reference or calibration events such as a shockwave initiated at a predetermined or known place in relation to the fibre, information along the complete length of the fibre may be collected for calibration purposes.

The present invention also provides for use of polarization-maintaining fibre (PMF) in the DEL arrangement. Furthermore, the present invention provides for the use of a polarisation maintaining single mode optical fibre in determining external disturbance directionality from partially coherent optical pulses backscattered to a detector.

Further aspects are i) the installation of the fibre in such a way as to minimise the coupling between polarisation eigenmodes; ii) the separate detection of the backscattered signals from each of the eigenmodes; iii) the ratioing of the two DEL disturbance signals to provide the direction from which the disturbance originated, with a 180° ambiguity; and iv) the use of D-fibre, which allows the identification, in space, of the directions of the birefringence axes of the fibre, and thus also of the origin of the disturbance.

The DEL system detects and locates external disturbances anywhere along the length of a single-mode optical fibre, to within the order of 1 meter. It does this by detecting changes in the interference on the backscattered signal from a partially-coherent optical pulse launched into the fibre.

The present invention allows a determination of the direction from which the disturbance originates (to within) 180°. It does this by using a polarization-maintaining fibre (PMF) and detecting, separately, the interference signals from each of the two polarization birefringence eigenmodes. A ratioing of the two disturbance amplitudes provides the tangent of the angular direction of the disturbance relative to the birefringence axes.

The directions of the birefringence axes in space can be determined by using, for example, D-fibre, and corresponding markings on the containing cable.

BRIEF DESCRIPTION OF THE DRAWINGS

Embodiments of the present invention, along with aspects of the prior art, will now be described with reference to the accompanying drawings, of which:

FIGS. 7-7c show schematic cross-sections through three different types of polarisation maintaining optical fibre;

DETAILED DESCRIPTION OF THE PREFERRED EMBODIMENTS

Figure 1:
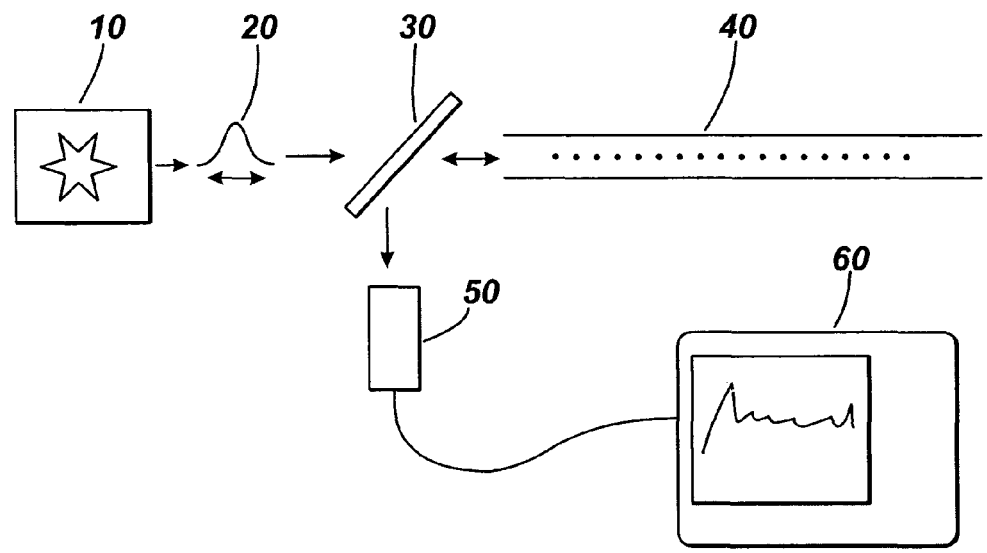
FIG. 1 illustrates apparatus for locating events in the environment of an optical fibre.

FIG. 1 illustrates an arrangement for partially coherent reflectometry. The arrangement includes a laser 10 or other optical source arranged to emit coherent light. The laser 10 is arranged to generate optical pulses 20 which are launched into an optical fibre 40. Between the laser 10 and fibre 40 is a beamsplitter 30 or optical circulator. The beamsplitter or optical circulator allows light from the laser to pass into the fibre. If a beamsplitter is used, a small amount of the input pulse can be tapped off for monitoring. The light is launched down the optical fibre 40 and some of the light is backscattered or reflected along the length of the fibre. Rayleigh backscattering occurs along the length of the fibre at scattering centres such as atoms, molecules, and other features of a size much smaller than the wavelength of the light. For example, the glass from which the core of the fibre is produced may be considered to be analogous to a fluid in which the atoms and molecules are largely frozen in positions. This similarity to a liquid results in a core material having small inhomogeneities along its length. The backscattered light travels back along the fibre and exits from the input end of the fibre. The backscattered light is incident upon the beamsplitter or circulator 30 and is directed towards photodetector 50. The photodetector converts the optical intensity to an electrical output which is passed to analyser 60. The analyser may include an analogue to digital converter to digitise the signal for subsequent processing by a digital processor.

To increase the intensity of the outgoing pulse 20 fibre amplifiers may be used. For the backscattered light exiting the fibre 40 a fibre amplifier is preferably used to amplify the backscattered light and increase the intensity of light incident on photodetector 50. Optical filtering may also be required to reduce noise such as amplified spontaneous emission (ASE) noise.

Figure 2:
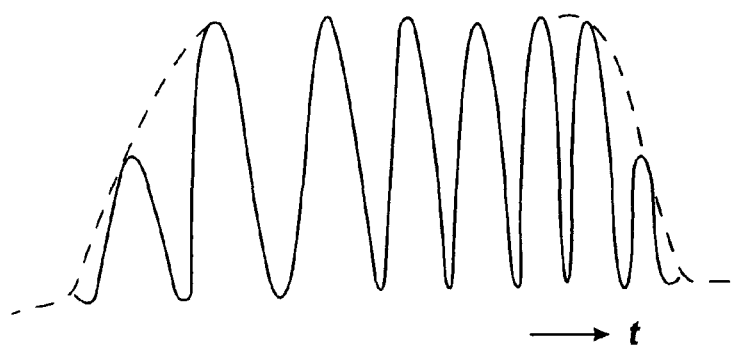
FIG. 2 shows schematically a pulse having a chirped frequency.
Figure 3:
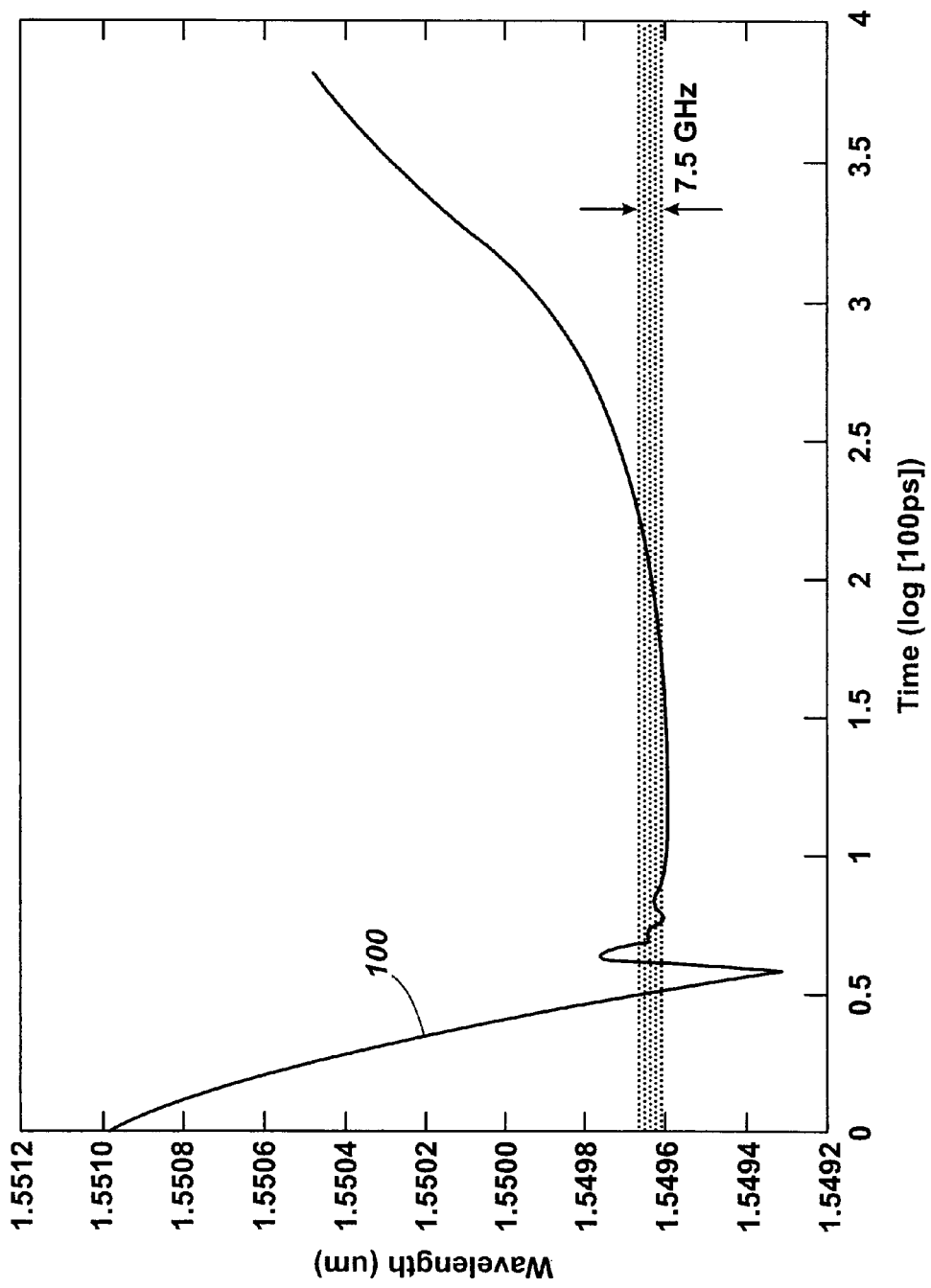
FIG. 3 is a graph showing the variation in wavelength of a semiconductor laser when driven by a current pulse.

FIG. 2 shows schematically an optical pulse emitted from laser 10. The pulse has a finite rise time as the laser is switched on, the amplitude then remains approximately constant until the laser is switched off. The frequency of the laser is not fixed but is chirped. In practice it is difficult to obtain a laser that as it is turned on it provides a fairly fixed wavelength. Most semiconductor lasers will change significantly in output wavelength as the laser is turned on and powered up to the correct power level. Hence, to achieve the desired frequency varying pulse a WDM filter can be used at the output of the laser to provide a narrow bandwidth of output light. FIG. 3 shows the typical wavelength variation 100 achieved with a DFB laser. By filtering the pulse with a 7.5 GHz wide WDM filter, a 7.5 GHZ chirped optical pulse is generated. Further details of this technique can be found in WO 2008/056143.

Figure 4:
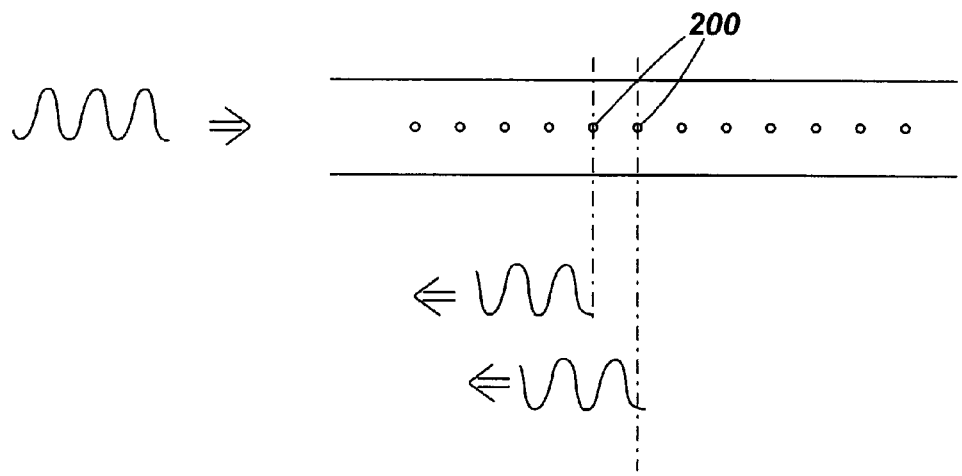
FIG. 4 schematically illustrates optical pulses being backscattered by scattering centres in an optical fibre.

As the optical pulse travels along the fibre Rayleigh backscattering will occur. FIG. 4 schematically illustrates Rayleigh backscattering occurring at scattering centres 200. From each scattering centre a portion of the partially coherent pulse may be elastically backscattered. As shown in the figure, the backscattered pulses from each scattering centre will have a phase relationship, which when incident on the photodetector will produce interference. Changes in the environment of the fibre such as changes in temperature and pressure change the refractive index of the fibre. If the refractive index of the portion of fibre between scattering centres 200 in FIG. 4 changes, this will result in the phase relationship between the backscattered pulses changing causing a variation in the intensity at the photodetector.

If we now consider the input pulse being Rayleigh backscattered at an almost continuous array of points along the fibre, the photodetector will receive a time varying speckle pattern of maximum duration equal to the length of time taken for the pulse to travel up and down the length of fibre 40. The temporal location within the speckle pattern of any particular feature directly correlates with the spatial location along the fibre.

Figure 5:
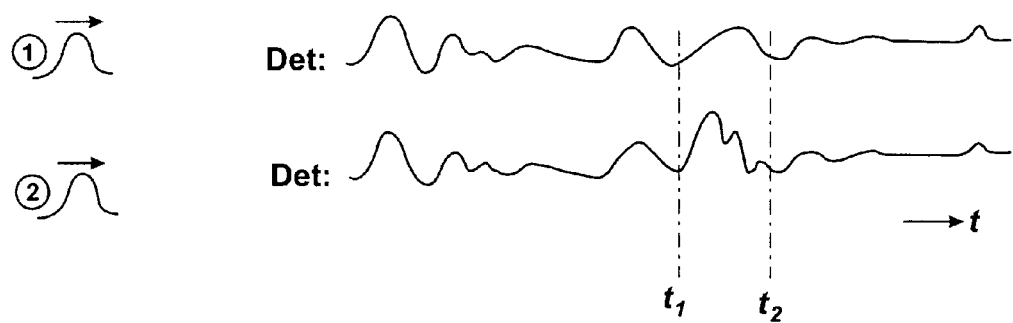
FIG. 5 shows schematically the temporal speckle pattern resulting from two optical pulses launched into a fibre a different times.

Successive pulses are launched into the fibre spaced apart in time such that only one pulse is travelling down the fibre at any time. A temporal speckle pattern is obtained for each pulse. Comparing the temporal speckle pattern of backscattered light for consecutive pulses provides an indication of variations in refractive index between one pulse and the next. Thus, acoustic waves and pressure or temperature variations incident on the fibre will be detected by a variation in the temporal speckle pattern. For example, FIG. 5 shows schematically the temporal speckle pattern seen by the photodetector (Det) for a first pulse ① and a second pulse ②. The speckle pattern is continuously varying in the time domain, which is equivalent to variation in backscatter along the length of the fibre. The received speckle patterns for the two pulses are largely the same except for the pattern received between times t1 and t2. Here the pattern received as a result of the second pulse shows an intensity increase thereby indicating a change in refractive index in the fibre at a location around half way along the length of the fibre.

Figure 6:
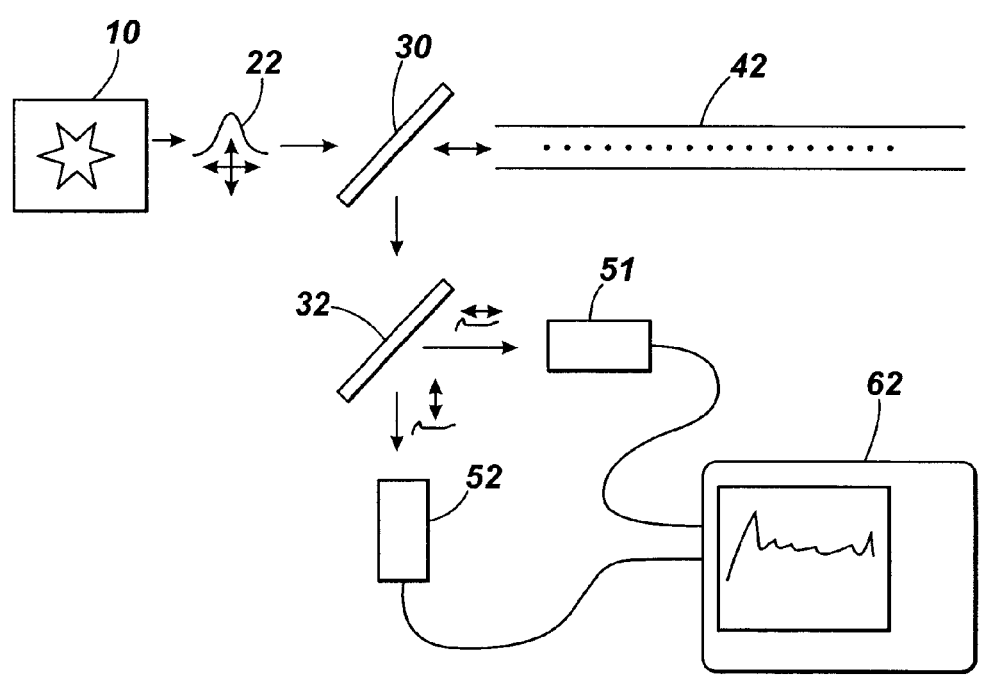
FIG. 6 illustrates apparatus for detecting the location and direction of events in the environment of an optical fibre.

A schematic illustration of the apparatus according to the present invention is provided in FIG. 6. The apparatus is a distributed fibre optic sensor instrument. Features corresponding to those in FIG. 1 are provided with like reference numerals.

Laser 10 is arranged to generate optical pulses 22. The optical pulses 22 are linearly polarised. The optical pulses may be at a wavelength of around 1550 nm as this is convenient for commercially available PMF. The laser may be a distributed feedback laser (DFB). Each pulse may have a duration of the order of 10 ns and a repetition frequency of around 10 kHz. The repetition frequency is preferably set so that a first pulse has travelled all of the length of the fibre and back before the next pulse is launched. The pulses have, in theory, a 0.1 GHz spectral width, but the pulse are chirped as discussed above to provide a variation in frequency as shown in FIG. 3. As the pulses are transmitted along the fibre the spectral width totals around 0.1 to 100 GHz. Typically, the pulses have an optical power of 0.1 W or 10 W or more. The pulses here described may be considered to be partially coherent pulses.

Figure 7:
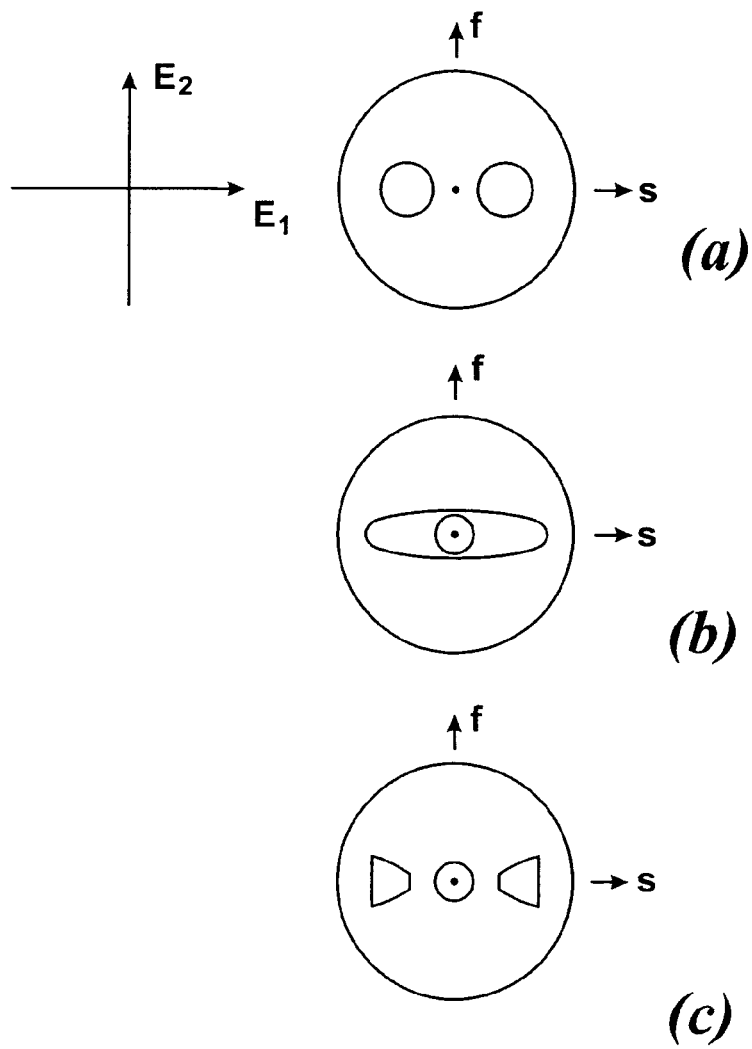

The optical pulses are launched into optical fibre 42 through the beamsplitter or optical circulator device 30. In the embodiment of FIG. 6 the optical fibre is polarization maintaining (PM) fibre. This type of fibre has two linearly polarised optically birefringent eigenmodes which propagate independently with little mutual coupling between them. Several types of polarisation maintaining fibre exist, three of which are illustrated in FIG. 7. All types include in the cladding components made of a different material to the cladding. The different material provides an inherent directional stress to the fibre core which results in two propagation eigenmodes. The two eigenmodes are often referred to as the fast and slow axis because light propagating along the two eigenmodes travel at very slightly different speeds.

FIG. 7a shows the internal structure of "PANDA" type PM fibre. The stress members in this type of fibre consist of two rods, one either side of the core and are usually spaced slightly from the core. The eigenmodes are parallel and perpendicular to the plane of the rods. The fast axis is perpendicular to the plane of the rods. FIG. 7b shows elliptical clad fibre in which the stress member is an elliptically shaped cladding surrounding the core. An outer cladding surrounds the elliptical cladding. The fast axis is perpendicular to the major axis of the ellipse. FIG. 7c shows "Bow-Tie" type PM fibre. This is similar to PANDA fibre but the stress members have a trapezoidal cross-section. Again the two eigenmodes are parallel and perpendicular to the plane of the stress members.

The linearly polarised pulse 22 is launched into the fibre 42 oriented such that the plane of polarisation is at 45° to the fast and slow eigenmodes of the PM fibre. This provides equal intensity pulses along each of the two eigenmodes of the fibre. Because the light in each eigenmode propagates largely independently of the other eigenmode, we have two largely independent interferometers. The backscatter along each eigenmode is largely independent of that along the other eigenmode. The backscattered light travels back along each eigenmode and is discharged from the input end of the fibre. The beamsplitter or circulator 30 should be polarisation maintaining such that all of the backscattered light from both eigenmodes is directed to polarisation splitter 32 where the two polarisation modes are separated. The polarisation splitter 32 may be a polarising beamsplitter or any device which separates the two orthogonal polarisation modes. The backscattered light from the two polarisation modes are directed to separate photodetectors 51 and 52. For example, the polarised light from the first eigenmode, the slow axis, is directed to first photodetector 51 and the light from the second eigenmode, the fast axis, is directed to a second photodetector 52. As mentioned above in relation to FIG. 1, optical amplifiers may be used to increase the intensity of the light incident on the photodetectors. They may also be used to increase the intensity of the input pulse, but are preferably used in combination with one or more filters. The optical amplifiers should also be polarisation maintaining with a minimum degree of cross-talk between eigenmodes, or separate optical amplifiers may be used for each eigenmode.

The electrical signals output from the photodetectors 51 and 52 are directed to an analyser 62. The photodetector preferably has an electrical bandwidth of 125 MHz. The signals may first be digitised using analogue to digital converters. The backscattered light will produce a temporal speckle pattern on each detector as described above in relation to FIG. 1. A temporal speckle pattern will arise for each polarisation eigenmode. The temporal speckle pattern is a self interference backscatter pattern. To detect disturbances, the temporal speckle pattern arising from successive pulses for each eigenmode are compared. The comparison takes place independently for each eigenmode in a similar manner to the comparison shown in FIG. 5. If a disturbance has occurred there will be a detected change in the speckle pattern at a given timing corresponding to a particular location along the fibre. In most cases the disturbance will arise on both polarisation eigenmodes but there may be circumstances when the change is seen on only one eigenmode, such as when disturbances occur parallel to one of the eignemodes.

From the amplitude of the change in speckle pattern for each eigenmode the direction from which the external disturbance arises can be determined. The process for obtaining this directional information will now be described.

Figure 8:
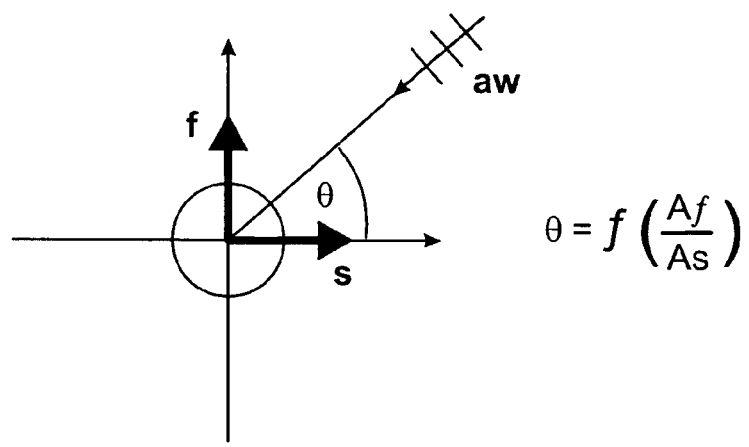
FIG. 8 illustrates an acoustic wave incident relative to the two eigenmodes of a polarisation maintaining optical fibre.

FIG. 8 illustrates an acoustic wave (aw) incident on the axis of the fibre at an angle θ. The direction θ is measured with respect to the slow axis of the fibre. The acoustic wave causes a change in the refractive index of the fibre resulting in a change in the amplitude of the speckle pattern arriving at the photodetector at time T. The amplitude of the speckle patterns for the two polarisation eigenmodes are measured using the technique described above. From this measurement the angle θ can be determined using $$\theta = f\left(\frac{A_f}{A_s}\right) \quad \text{(Equation 1)}$$

where $A_f$ and $A_s$ are the amplitudes of the speckle pattern for the fast and slow eigenmodes respectively.

In the simple case where compression effects in the fibre are insignificant, the angle θ may be determined by $$\theta = \tan^{-1}\left(\frac{A_f}{A_s}\right) \quad \text{(Equation 2)}$$

The function of equation 2 has a periodicity of 180°. Hence, solving for the direction of the disturbance gives two possible results separated by 180°. Additional techniques described below allow the direction of incidence of the disturbance to be determined uniquely.

Figure 9:
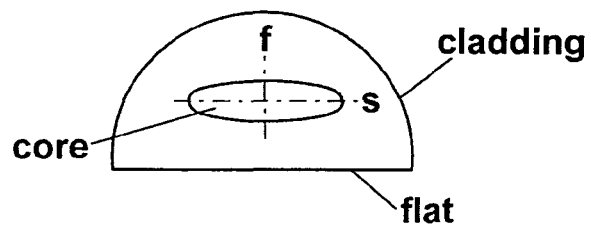
FIG. 9 is schematic illustration of D-shaped optical fibre.

To establish the direction in space from which the disturbance causing the acoustic wave arises the orientation of the fibre is preferably known. For example, if the technique is used in an intruder detection system, the orientation of the fibre along the perimeter should be known. The use of fibre having a D-shaped outer cladding allows the fibre to be positioned accurately. For example, the flat of the D-fibre may correspond to the orientation of the slow-axis of the fibre, as shown in FIG. 9. Alternatively, the orientation of one of the axes of the fibre may be represented on the outside of the cladding, or cable structure in which the fibre resides, by a stripe or groove. Other means of identifying the orientation of the axes of the fibre exist. For example, a calibration technique of initiating a disturbance event such as an explosion, gunshot, or shockwave at a known position in the vicinity of the fibre may be performed. Pressure waves resulting from the event are incident on the whole length of fibre influencing the refractive index along the fibre. The resulting backscatter pattern for each position along the fibre may provide a data set to allow the position and direction of unknown disturbances to be determined.

It is important that in use the fibre is not twisted or bent sharply because this may introduce significant coupling between the two polarisation eignmodes.

The majority of fibres and disturbances will be more complex than the case described by equation 2. In general, the polarisation maintaining fibre has a transversely asymmetric core, such as an elliptical core (see FIG. 7*b*). A number of effects arise when the fibre is compressed, for example, by an acoustic wave or other external transverse pressure. The fibre is transversely squeezed along one or more of its major and minor axes of symmetry. As a result, and according to Poisson's effect for a compressible body, a compression in one or two dimensions will result in an elongation in the third dimension. Therefore, transverse compression may result in longitudinal elongation of the fibre. These effects will cause consequential changes in the refractive index and birefringence of the PM-fibre. Therefore, more general equation 1 will apply.

Equation 1 provides a relationship between the amplitudes of the speckle patterns for the two eigenmodes and the angle of the disturbance θ. The precise relationship may be determined empirically, such as by performing a calibration sequence on the fibre configuration. The calibration sequence may provide for example a look-up table, and/or an equation determined from curve fitting of the calibration data.

Figure 10:
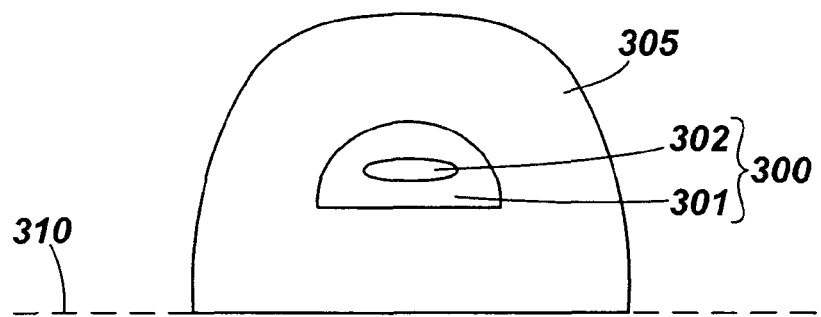
FIG. 10 is illustration of a cross-section of cable containing D-shaped optical fibre.

In an embodiment of the present invention, D-shaped, polarisation maintaining fibre is provided within a mechanically keyed cable, such as shown in FIG. 10. The D-fibre 300 may be that shown in FIG. 9, having an elliptical core 302 and D-shaped cladding 301. The fibre is incorporated in cable 305. FIG. 10 is not to scale and the diameter of the fibre may be much less than the diameter of the cable. The cable allows transmission of transverse mechanical forces to the fibre from the exterior, but provides minimal axial strain on the fibre. The optical fibre preferably has a polarization beat-length of the order of millimeters to minimize optical coupling between the orthogonal polarisation eigenmodes. Any coupling between modes is generated from changes in the birefringence induced by external forces outside of the cable.

The cable is installed in a known orientation to facilitate determination of the direction of incoming external disturbances, such as by installing mechanical reference surface 310 parallel to a reference surface in the detection environment. For example, in a pipeline the reference surface may be provided facing or close to the bottom of the pipeline. In an intruder detection system the mechanical reference surface may be provided face down or face up, for example, around a perimeter. A particular application of the cable is for the determination of cracks in the rock structure around oil wells when water is forced into the well to extract oil from deep within the well.

Figure 11:
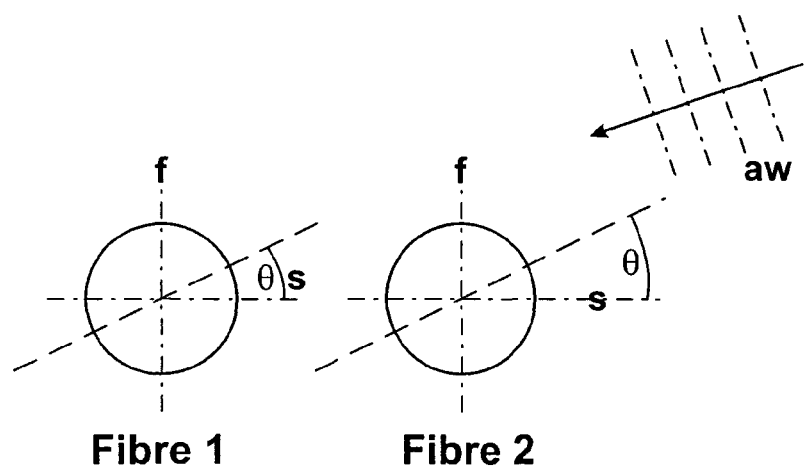
FIG. 11 illustrates two polarisation maintaining fibres arranged next to each other.

As mentioned above, equation 1 will not provide a unique solution for the angle θ. Depending on the axial symmetry of the fibre, equation 2 may or may not provide a unique solution. If it is desirable to determine the angle θ uniquely, two polarisation maintaining fibres may be used with the system described above. The two fibres may be incorporated into a single cable or separate cables. Each of the two fibres provides location (along the length of the fibre) and direction (radial direction from the fibre) information on disturbances in the environment of the fibres. Therefore, both fibres provide two solutions to the angle θ if using equation 1 above. FIG. 11 shows two fibres with an acoustic wave (aw) incident on the fibres. The acoustic wave (aw) will reach fibre 2 before it reaches fibre 1. Therefore, changes in the refractive index, and consequently changes in the detected speckle pattern, will occur on fibre 2 before they occur on fibre 1. Based on which fibre receives the acoustic wave first, the direction of incidence can be selected from the two solutions of equation 1.

To determine which fibre receives the acoustic wave second, the time interval between optical pulses should be less than the acoustic delay, preferably significantly less. Fibres aligned closely next to each other will require a higher pulse repetition rate than for fibres spaced apart. For example, fibres in the same cable, spaced by a few millimeters, may require a higher pulse rate than fibres arranged separately and for example spaced ~10 cm apart.

The axial orientation of the two PM fibres is preferably as shown in FIG. 11, but other orientations can also be used provided the orientation of both fibres is known. To maintain the two fibres with a fixed rotational relationship between them, it is convenient to provide two fibres in one cable.

In the embodiments of the present invention described above polarised light is launched into both of the polarisation eigenmodes of the polarisation maintaining fibre. In an alternative embodiment, two PM fibres may be provided and light is launched into only one of the polarisation eigenmodes of each fibre. The eigenmodes in the fibres in which light is launched are oriented at angle to each other, such as 45°, and the same techniques as described above are employed to determine an angle from which a disturbance originates by comparing variations in speckle patterns for the two fibres.

The person skilled in the art will readily appreciate that various modifications and alterations may be made to the above described methods and apparatus without departing from the scope of the appended claims. For example, different materials, dimensions and shapes of fibre cladding and cable may be used.

The invention claimed is:

1. A distributed fibre optic sensing method for determining location and direction information of disturbances occurring in the environment of a sensing optical fibre, the method comprising:
   launching optical pulses into first and second polarisation eigenmodes of polarisation maintaining sensing optical fibre;
   detecting temporal speckle patterns of the optical pulses backscattered from the polarisation eigenmodes of the sensing optical fibre, said temporal speckle patterns being intensity variations resulting from self-interference of backscatter within the sensing optical fibre;
   comparing the temporal speckle patterns detected from a first or second polarisation eigenmode to determine information of the location of a disturbance in the environment of the sensor optical fibre,
   wherein the location information corresponds to a distance along the sensing optical fibre, and
   the method further comprising comparing between changes in the temporal speckle patterns of the first and second polarisation eigenmodes to determine direction information of the disturbance, the direction information corresponding to a radial direction from the axis of the sensing optical fibre, and refractive index in the sensing fibre being changed in the vicinity of the disturbance.

2. The method of claim 1, wherein the location information of the disturbance is determined from a range dependent timing of changes in the temporal speckle patterns.

3. The method of claim 1, wherein said direction information is determined from a comparison of the temporal speckle patterns at a range specific timing for two polarisation eigenmodes.

4. The method of claim 1, wherein the step of detecting comprises splitting the backscattered light into constituent polarisation eigenmodes and detecting the intensity of backscattered light in each eigenmode.

5. The method of claim 1, wherein the optical pulse is polarised.

6. The method of claim 1, wherein the optical pulse is launched at substantially 45° to the polarisation eigenmodes of the polarisation maintaining fibre such that the amplitudes launched into the two eigenmodes are substantially equal.

7. The method of claim 1, wherein the step of comparing comprises:
   comparing the temporal speckle pattern of backscattered light from a first eigenmode component of a first pulse with the temporal speckle pattern of backscattered light from a first eigenmode component of a second pulse to determine a first change in refractive index of the fibre at a location along the length of the fibre;
   comparing the temporal speckle pattern of backscattered light from a second eigenmode component of the first pulse with the temporal speckle pattern of backscattered light from a second eigenmode component of a second pulse to determine a second change in refractive index at a location along the polarisation maintaining optical fibre; and
   determining an angular direction of the disturbance from the comparison for each eigenmode.

8. The method of claim 1, further comprising calibrating the relationship between changes in the speckle pattern for the polarisation eigenmodes and location and direction information.

9. The method of claim 8, further comprising calculating the location and direction of the disturbance about the fibre using the relationship determined in the step of calibrating.

10. The method of claim 8, wherein the step of calibrating comprises initiating a disturbance event at a known position in the environment of the sensing optical fibre, the step of detecting comprises detecting temporal speckle patterns of light backscattered from the polarisation eigenmodes, and further comprising determining a relationship between the known position and changes in the detected temporal speckle patterns.

11. The method of claim 1, wherein the step of launching comprises launching optical pulses into two lengths of polarisation maintaining optical fibre arranged parallel to each other and having a fixed angular relationship between first polarisation eigenmodes of the polarization maintaining optical fibres along their length; and
   the step of detecting comprises detecting a temporal speckle pattern of backscattered light from the two polarisation maintaining fibres.

12. A method of determining location and direction information of disturbances occurring in the environment of a boundary, the method comprising providing a polarisation maintaining fibre along the boundary and performing the method of claim 1.

13. A method of determining location and direction information of disturbances occurring in the environment of a pipeline, pipe, well, or hole, the method comprising providing a polarisation maintaining fibre in or adjacent to the pipeline, pipe, well, or hole and performing the method of claim 1.

14. A distributed fibre optic sensor apparatus for determining location and direction information on disturbances occurring in the environment of a sensing optical fibre, the apparatus comprising:
   the sensing optical fibre comprising a length of polarisation maintaining optical fibre, having first and second polarization eigenmodes;
   a light source arranged to launch optical pulses into first and second polarisation eigenmodes of the sensing optical fibre;
   a photodetector for detecting temporal speckle patterns of the optical pulses backscattered from first and second polarisation eigenmodes of the length of optical fibre, said temporal speckle patterns being intensity variations resulting from self-interference of backscatter within the sensing optical fibre;
   an analyser arranged to compare said temporal speckle patterns detected from a first or second polarisation eigenmode to determine information of the location of a disturbance in the environment of the sensing optical fibre,
   wherein the location information corresponds to a distance along the sensing optical fibre, and the analyser further arranged to compare between changes in the temporal speckle patterns of the first and second polarisation eigenmodes to determine direction information of the disturbance, the direction information corresponding to a radial direction from the axis of the sensing optical fibre, and refractive index in the sensing fibre being changed in the vicinity of the disturbance.

15. The apparatus of claim 14, wherein the analyser is configured to determine location information of the disturbance from a range dependent timing of changes in the temporal speckle patterns.

16. The apparatus of claim 14, wherein the analyser is arranged to determine said direction information from a comparison of the temporal speckle patterns at a range specific timing for two polarisation eigenmodes.

17. The apparatus of claim 14, further comprising: a polarisation splitter to split the backscattered light into constituent polarisation eigenmodes; and
the photodetector comprises two photosensitive elements, each arranged to detect the amplitude of backscattered light in each eigenmode.

18. The apparatus of claim 14, wherein the light source is configured to provide polarised optical pulses.

19. The apparatus of claim 14, wherein the light source is arranged to launch the optical pulse at substantially 45° to the polarisation eigenmodes of the polarisation maintaining optical fibre such that the amplitudes launched into the two eigenmodes are substantially equal.

20. The apparatus of claim 14, wherein the analyser is arranged to perform the steps of:
comparing the temporal speckle pattern of backscattered light from a first eigenmode component of a first pulse with the temporal speckle pattern of backscattered light from a first eigenmode component of a second pulse to determine a first change in refractive index of the fibre at a location along the length of the polarisation maintaining optical fibre;
comparing the temporal speckle pattern of backscattered light from a second eigenmode component of the first pulse with the temporal speckle pattern of backscattered light from a second eigenmode component of a second pulse to determine a second change in refractive index at a location along the polarisation maintaining optical fibre; and
determining the angular direction of the disturbance from the comparison for each eigenmode.

21. The apparatus of claim 14, wherein the analyser comprises a memory for storing calibration information relating changes in the speckle pattern for the polarisation eigenmodes to location and direction information.

22. The apparatus of claim 21, wherein the analyser is arranged to calculate location and direction information of the disturbance using the calibration information.

23. The apparatus of claim 14, arranged for launching optical pulses into two lengths of polarisation maintaining optical fibre arranged parallel to each other and having a fixed angular relationship between first polarisation eigenmodes of the polarisation maintaining optical fibre along their length; and
the photodetector comprises two photosensitive elements each arranged to detect a temporal speckle pattern of backscattered light from one of the two polarisation maintaining optical fibres.

24. Apparatus for determining location and direction information of disturbances occurring in the environment of a boundary, the apparatus comprising the apparatus of claim 14, wherein the polarisation maintaining optical fibre is provided along the boundary.

25. Apparatus for determining location and direction information of disturbances occurring in the environment of a pipeline, pipe, well, or hole, the apparatus comprising the apparatus of claim 14, wherein the polarisation maintaining optical fibre is provided in or adjacent to the pipeline, pipe, well, or hole.

26. The apparatus of claim 14, wherein the environment being measured is adjacent to the sensing optical fibre.

27. The apparatus of claim 14, wherein the refractive index in the sensing fibre is changed in the vicinity of the disturbance.

28. A distributed fibre optic sensor apparatus for determining location and direction information on disturbances occurring in the environment of a sensing optical fibre, the apparatus comprising:
first and second sensing optical fibres, each comprising a length of polarisation maintaining optical fibre;
a light source arranged to launch optical pulses into at least one polarisation eigenmode of each of the first and second sensing optical fibres, the at least one polarisation eigenmode of the sensing optical fibres in which light is launched oriented at an angle to each other;
a photodetector for detecting temporal speckle patterns of the optical pulses backscattered from the polarisation eigenmodes of the sensing optical fibres; said temporal speckle patterns being intensity variations resulting from self-interference of backscatter within the sensing optical fibres;
an analyser arranged to compare between said temporal speckle patterns detected from a polarisation eigenmode of the first or second sensing optical fibre to determine information of the location of a disturbance in the environment of the sensing optical fibres, wherein the location information corresponds to a distance along the first or second sensing optical fibre, and the analyser further arranged to compare between changes in the temporal speckle patterns of the first and second sensing optical fibres to determine direction information, the direction information corresponding to a radial direction from the axes of the sensing optical fibres, and the refractive index in the sensing optical fibres being changed in the vicinity of the disturbance.

29. A distributed fibre optic sensing method for determining location and direction information on disturbances occurring in the environment of a sensing optical fibre, the method comprising:
launching optical pulses into first and second sensing optical fibres, each comprising a length of polarisation maintaining optical fibre and the optical pulses being launched into at least one polarisation eigenmode of each of the first and second sensing optical fibres, the at least one polarisation eigenmode of the sensing optical fibres in which light is launched oriented at an angle to each other;
detecting temporal speckle patterns of the optical pulses backscattered from the polarisation eigenmodes of the sensing optical fibres, said temporal speckle patterns being intensity variations resulting from self-interference of backscatter within the sensing optical fibres;
comparing the temporal speckle patterns detected from a polarisation eigenmode of the first or second sensing optical fibre to determine information of the location of a disturbance in the environment of the sensing optical fibres,
wherein the location information corresponds to a distance along the first or second sensing optical fibre, and
the method further comprising comparing between changes in the temporal speckle patterns of the first and second sensing optical fibres to determine direction information, the direction information corresponding to a radial direction from the axes of the sensing optical fibres, and refractive index in the sensing optical fibres being changed in the vicinity of the disturbance.

* * * * *